United States Patent
Holt

(10) Patent No.: US 7,131,050 B2
(45) Date of Patent: Oct. 31, 2006

(54) OPTIMIZED READ PERFORMANCE METHOD USING METADATA TO PROTECT AGAINST DRIVE ANOMALY ERRORS IN A STORAGE ARRAY

(75) Inventor: Keith W. Holt, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 474 days.

(21) Appl. No.: 10/085,929

(22) Filed: Feb. 28, 2002

(65) Prior Publication Data
US 2003/0163777 A1 Aug. 28, 2003

(51) Int. Cl.
*G01C 29/00* (2006.01)
(52) U.S. Cl. .......................................... 714/763; 360/53
(58) Field of Classification Search ................ 714/763, 714/764, 769, 770, 805, 820, 766; 713/30; 365/49; 711/112, 114; 360/31, 53
See application file for complete search history.

(56) References Cited

U.S. PATENT DOCUMENTS

| | | | |
|---|---|---|---|
| 5,265,104 A | 11/1993 | Weng | |
| 5,274,645 A | 12/1993 | Idleman et al. | |
| 5,333,143 A | 7/1994 | Blaum et al. | |
| 5,398,253 A | 3/1995 | Gordon | |
| 6,769,088 B1 | 7/2004 | Weng | |

*Primary Examiner*—Guy J. Lamarre
(74) *Attorney, Agent, or Firm*—Suiter West Swantz PC LLO

(57) ABSTRACT

The present invention is an apparatus and method for protecting against drive anomaly errors while optimizing random read performance. Data block persistency is explicitly verified when a data block is written. Data block integrity and location checks are performed by reading data from a single drive. Through such a process, reading of metadata from a second drive is not required, thus decreasing the drive I/O workload. In an example of the invention, a combination of a CRC and a location tag interleaved as metadata along with user data on a single drive may be employed to perform a read operation in accordance with the present invention.

18 Claims, 3 Drawing Sheets

OPTIMIZED READ PERFORMANCE METHOD USING METADATA TO PROTECT AGAINST DRIVE ANOMALY ERRORS IN A STORAGE ARRAY

FIELD OF THE INVENTION

The present invention generally relates to the field of storage array controllers, and particularly to an apparatus and method for efficiently detecting and recovering drive anomaly errors.

BACKGROUND OF THE INVENTION

Reliable storage and the utilization of high availability storage arrays employing disk drives as the storage media are becoming evermore popular as data is stored electronically. Data is stored to, and retrieved from, an array of disks on a behalf of one or more host computer systems by storage array controllers. A major requirement of storage systems is the transfer and retrieval of data without error. Thus, storage systems and storage array controllers employ error detection and recovery algorithms to ensure data integrity.

A problem associated with high availability storage arrays is the return of incorrect data by a disk drive without an error indication. These types of errors may occur when writing data to, and reading data from storage media. Drive anomaly protection is characterized by the assurance of data integrity, persistency and location. Data integrity assurance means that all bytes in a data block are stored, retrieved and transmitted correctly. Location assurance means that the data was stored to or retrieved from the correct physical location. Persistency assurance refers to whether data is actually written to media. Thus, detection of drive write anomalies involves the cross-checking of the integrity, persistency and location of data.

An approach known to the art to detect drive anomalies begins by storing a write sequence tracking metadata. The sequence information is stored on separate disks as metadata during write operations. On a subsequent read operation, the metadata is read from both disks and verified for consistency. The sequence information may be used to determine which drive is in error when the sequence information on the data drive is different from the parity drive. If the data drive is in error, the data is extracted from the parity drive via normal reconstruction techniques. The write sequence tracking scheme is implemented with a cyclic redundancy check (CRC) or similar form of error detection and correction code to provide data integrity protection. This provides data integrity assurance at a byte level to protect against drive anomaly errors in which the majority of data in the sector or sectors is correct. The CRC information may be stored as metadata along with the write sequence tracking information.

With this approach, write operations are tracked at two levels of granularity. The first level is when the scope of a write operation is limited to an individual drive plus the associated parity drive. In this case, the level of granularity is a data block such as the cache block size used to manage the storage controller's data cache. Each data block within a data stripe has its own separate revision number. The revision numbers of all data blocks are stored on the associated parity drive.

A second level of granularity is provided when all data blocks within a stripe are written. Each storage controller maintains a monotonically increasing value that is used to track full stripe writes on a storage controller basis. Tracking full stripe writes separately allows the controller to avoid having to perform a read-modify-write function on all of the associated data block revision numbers. When a full striped write occurs, all data block revision numbers are initialized to a known value.

The approach known to the art for detecting drive anomalies employs data read operation integrity cross-checks that require reading some form of metadata from a second drive. This effectively doubles a drive input/output (I/O) workload that results in a severe performance degradation for random read I/O profiles. In typical disk drives, the estimated impact is 40% decrease in I/O per second performance if the workload averages one or more I/O operations per drive. Further, this performance impact is relatively constant across a wide range of I/O sizes, drive seek ranges, and drive I/O queue depths. The decrease in performance is due to the fact that drive I/O per second performance does not double when workload doubles. Since only half of the drive I/O operations return user data, performance decreases from the host's perspective. Consequently, an apparatus and method for performing drive anomaly detection while optimizing random read performance is necessary.

SUMMARY OF THE INVENTION

Accordingly, the present invention is directed to an apparatus and method for protecting against drive anomaly errors while optimizing random read performance. In one embodiment of the invention, data block persistency is explicitly verified when a data block is written. Data block integrity and location checks may be performed by reading data from a single drive. Through such a process, reading of metadata from a second drive is not required, thus providing anomaly protection without decreasing performance by increasing the drive I/O workload.

A drive anomaly protection apparatus of the present invention may employ a combination of a CRC and a location tag interleaved as metadata along with user data on a single drive. The location tag of the present invention may provide an indication of the logical block address or address range expected to be associated with a data block. Data persistency may be verified as part of each write operation through a write validation that ensures that data has been written to media. Data integrity assurance may be provided through the use of CRC information generated for each sector and stored as metadata during write operations. During read operations, the data block and CRC information may be retrieved from the drive and cross-checked for consistency. This may ensure that the correct data is retrieved. The location tag may also be checked during read operations by comparing it to the expected value that protects against retrieving data from an incorrect physical location.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
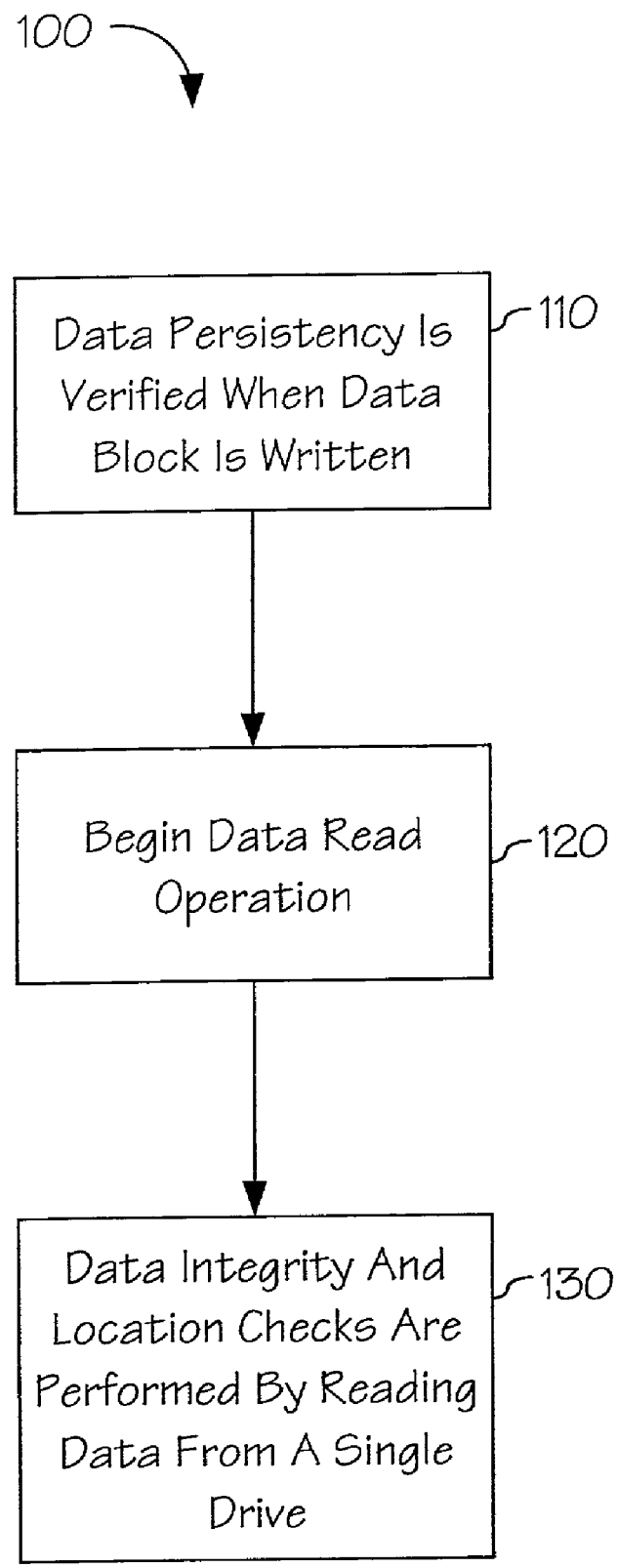
FIG. 1 is a flow diagram depicting an exemplary method of the present invention for providing drive anomaly protection.

Referring to FIG. 1, a flow diagram 100 depicting an exemplary method of the present invention for providing drive anomaly protection is shown. The process may begin upon the verification of data persistency when a data block is written 110. This may ensure that stale data is not returned on a read operation. The commencement of a data read operation 120 follows the data persistency verification.

In accordance with the present invention, data integrity and location checks may be performed by reading data from a single drive 130. This may ensure that data has been retrieved properly from the correct physical location. In one embodiment of the invention, a data integrity test may be accomplished through a parity error detection algorithm such as a cyclic redundancy check (CRC). A location check may include a comparison of a location tag with an expected value.

Process 100 is advantageous as this may provide drive anomaly protection while optimizing random read performance. Applications that have a read/write ratio greater than one will experience improved performance compared to prior approaches since the process 100 of the present invention impacts drive workloads only for write operations. In addition, this performance benefit may provide increased benefits as the read/write ratio increases.

In one embodiment of the invention, persistency may be verified by means of a write validation that may ensure that data has been written to the media. The write validation may be synchronous or asynchronous to the completion of the write operation as long as the validation is complete prior to a host read of the data block. Synchronous validation may be accomplished by use of a drive "write verify with byte check" command. Asynchronous validation may be accomplished as a background operation by reading the data block and metadata via a drive "read with forced unit access" command. The results of the "read with forced unit access" command may be compared with data cached in the controller. A second method of asynchronous validation may allow the storage controller to return completion status to the host computer system prior to write validation.

Figure 2:
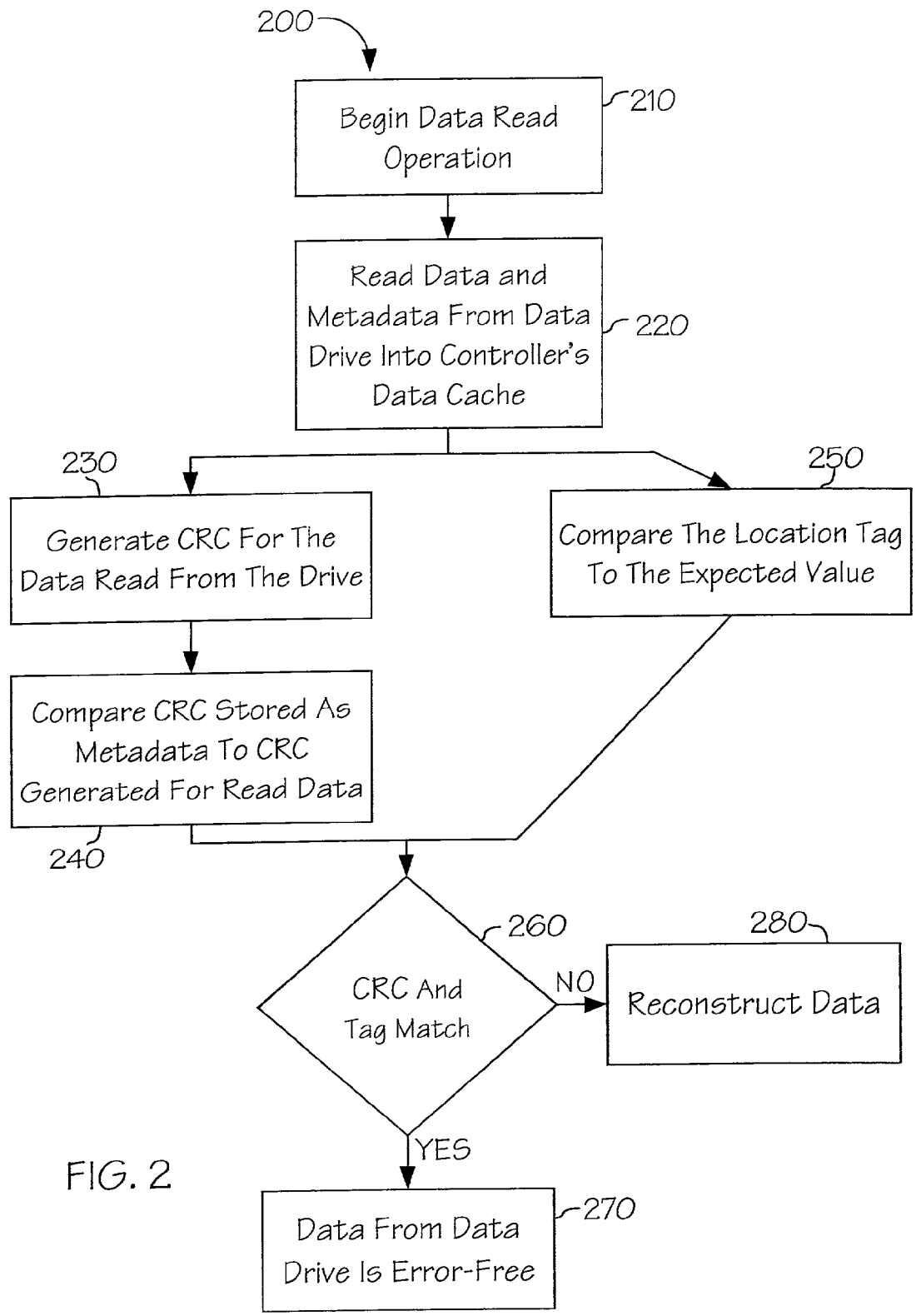
FIG. 2 is a flow diagram depicting an exemplary process for performing a read operation and recovery algorithm in accordance with the present invention.

Referring now to FIG. 2, a flow diagram depicting an exemplary process for performing a read operation and recovery algorithm 200 in accordance with the present invention is shown. The process may begin upon the commencement of a data read operation 210. Data and metadata from a data drive may be read into a controller's data cache 220. Metadata may be interleaved with user data for performance reasons. The granularity used for interleaving is flexible with regard to the algorithm.

CRC information may be generated for the data read from the data drive 230. The CRC information generated for the data read may be compared with the CRC information stored as metadata 240. This may be employed to ensure data integrity. Along with a CRC verification, a comparison of a location tag may be performed against an expected value 250. The location tag may be interleaved as metadata and provide an address range for the block of data. A determination of a CRC information and location tag match is performed 260. If the CRC information and location tag match, then the data from the data drive is error free 270. Thus, the data has been retrieved properly from the correct physical location. If the CRC information and the location tag do not match, then the data may be reconstructed 280.

Data integrity assurance at a byte level may be provided through the use of CRC information generated for each sector and stored as metadata during write operations. On read operations, the data block and CRC may be retrieved from the drive and cross-checked for consistency. This check may protect against partial data block corruption resulting from a misdirected write or any other anomaly that changes the data pattern on media. The location tag may be checked on read operations by comparing it to the expected value as described in step 250. This check may protect against full data block corruption resulting from a misdirected write.

Data recovery 280 may be implemented through multiple techniques. For example, data recovery may be possible through Redundant Array of Inexpensive Disks (RAID) parity schemes. Other types of data recovery may also be implemented with the algorithm 200 of the present invention by those with ordinary skill in the art without departing from the scope and spirit of the present invention. If a data drive is in error, data may be recovered using normal data reconstruction techniques. If a parity drive is in error, parity may also be rebuilt using parity repair techniques.

It should be understood that a various types of parity error information sets may be employed in accordance with the present invention to provide data integrity assurance without departing from the scope and spirit of the present invention. One type of parity error information set is CRC information. CRC information refers to an error detection method that uses parity bits generated by polynomial encoding of the data. It appends those parity bits to the data word. Receiving devices have decoding algorithms that detect errors in a data word. The decoding algorithm treats all bit streams as binary polynomials. CRC may be implemented through hardware, such as a shift register and exclusive OR gating circuitry. Software algorithms may also be employed to implement CRC.

The location tag of the present invention and referred to in the algorithm 200 may provide an indication of the logical block address or address range that is expected to be associated with the data block. As an example, the location tag may be set to the host logical block address associated with the start of the data block. The selection of a location tag for a given data block is flexible with regard to the algorithm.

In alternative embodiments of the present invention, CRC information may be generated and checked in multiple ways. In one embodiment of the invention, a hardware assist may be available for performance reasons, however, this is not required. When reading data from a disk, CRC information may be generated on the fly (simultaneous to receipt of data) or after the data has been received into the controller's data cache. A data integrity check may be performed with CRC information generated from well-known polynomials or alternative forms of error detection and correction codes. Other forms of error detection and correction code include, but are not limited to, Hamming codes, maximum-length codes, Bose-Chaudhuri-Hocquenghem Codes, Reed- Solomon Codes, and Convolutional Codes. Further, multiple ways of managing the CRC and location tag metadata may be available to those of ordinary skill in the art without departing from the scope and spirit of the present invention.

The read operation and data recovery algorithm 200 of the present invention is advantageous in many respects. The process of the present invention may allow symmetrical protection for data and parity drives. In one embodiment of the invention, there is not a distinction made between user data and parity information. CRC information and location tags may be generated, stored as metadata, and checked for the parity drive in a stripe just as it would be in a data drive. Another advantageous aspect of the read operation and data recovery algorithm 200 of the present invention is the flexibility in managing the metadata. The algorithm 200 may not have any explicit requirements on the granularity of the location tag or interleaving of metadata and user data. Further, there is not a requirement that either reads or writes of metadata and user data be atomic operations.

Figure 3:
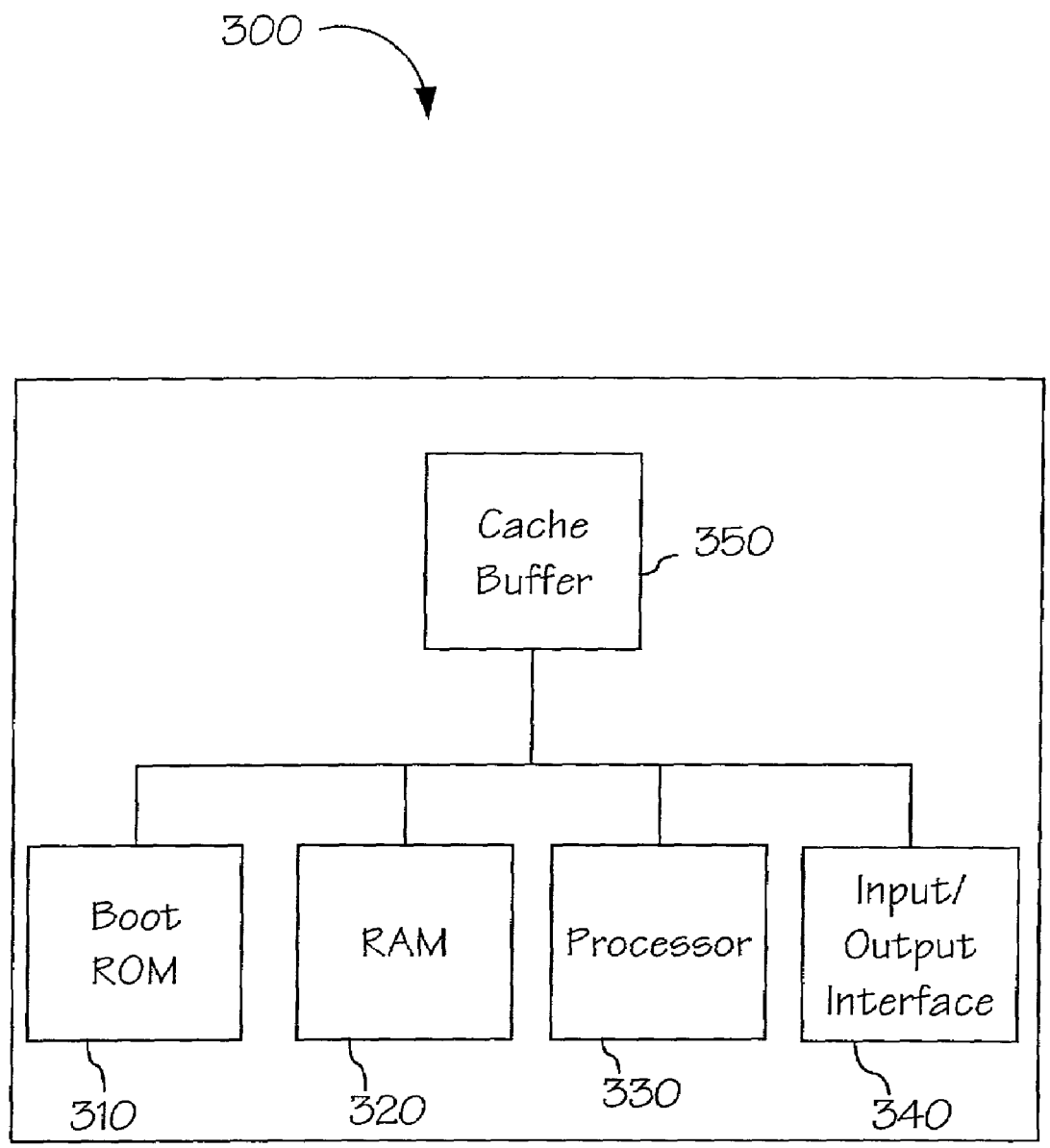
FIG. 3 depicts an embodiment of a storage controller of the present invention.

Referring now to FIG. 3, an embodiment of a storage controller 300 of the present invention is shown. In one embodiment of the invention, storage controller 300 may implement process 200 depicting an embodiment of a flow diagram for performing a read operation and recovery algorithm 200 of the present invention. Storage controller 300 may include boot read only memory (ROM) 310, random access memory (RAM) 320, processor 330, input/output interface 340, and a cache buffer 350. Input/output interface may receive/deliver data according to a desired protocol. Processor 330 may execute a program of instructions which may execute steps as shown in process 200 and may execute an algorithm on received data and transform the data into a desired protocol. It should be understood by those with ordinary skill in the art that process 200 may be implemented by other means than storage controller 300 without departing from the scope and spirit of the present invention.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for detecting drive anomalies, comprising:
   (a) verifying data is written to a media upon an occurrence of a write operation, said write operation including a data persistency verification;
   (b) performing a data block integrity test by only reading from a single drive during an occurrence of a read operation; and
   (c) performing a location check by only reading from said single drive during said occurrence of said read operation, said single drive including interleaved metadata with data, whereby retrieval of correct data from a correct physical location is ensured.
2. The method as claimed in claim 1, wherein said data persistency verification determines whether data is written to said media.
3. The method as claimed in claim 1, wherein a random read performance is increased by removing the requirement of reading a form of metadata from a second drive.
4. The method as claimed in claim 1, wherein said data block integrity test ensures that data has been retrieved properly.
5. The method as claimed in claim 1, wherein said location check ensures that data has been retrieved from the correct physical location.
6. A method for detecting drive anomalies, comprising:
   (a) verifying data is written to a media upon an occurrence of a write operation, said write operation including a data persistency verification;
   (b) performing a data block integrity test by only reading from a single drive during an occurrence of a read operation; said data block integrity test employing a parity error detection algorithm; and
   (c) performing a location check by only reading from said single drive during said occurrence of said read operation, said location check including the comparison of a location tag with an expected value, said single drive including interleaved metadata with data, whereby retrieval of correct data from a correct physical location is ensured.
7. The method as claimed in claim 6, wherein said data persistency verification determines whether data is written to said media.
8. The method as claimed in claim 6, wherein a random read performance is increased by removing the requirement of reading a form of metadata from a second drive.
9. The method as claimed in claim 6, wherein said data block integrity test ensures that data has been retrieved properly.
10. The method as claimed in claim 6, wherein said location check ensures that data has been retrieved from the correct physical location.
11. The method as claimed in claim 6, wherein said parity error detection algorithm is a cyclic redundancy check.
12. A method of detecting drive anomalies during a read operation, comprising:
    (a) reading only from a single drive into a cache memory, said single drive including interleaved metadata with data;
    (b) generating a first parity error information set for a read from said single drive;
    (c) comparing a second parity error information set with said first parity error information set; and
    (d) comparing a location tag with an expected value, wherein a data integrity test and location check is performed by only reading from said single drive.
13. The method as claimed in claim 12, wherein data has been retrieved correctly from said single drive when said first parity error information set matches said second parity information set.
14. The method as claimed in claim 13, wherein said second parity error information set is stored as metadata.
15. The method as claimed in claim 13, wherein said first parity error information set and said second parity error information set are cyclic redundancy check information.
16. The method as claimed in claim 12, wherein data has been retrieved from a correct physical location when said location tag matches said expected value.
17. The method as claimed in claim 16, wherein said location tag provides an indication of an address range associated with a data block.
18. The method as claimed in claim 17, wherein a range of said address range is flexible.

* * * * *